(12) United States Patent
Henderson

(10) Patent No.: US 6,446,513 B1
(45) Date of Patent: Sep. 10, 2002

(54) HIGH ACCURACY FLOW RESTRICTOR USING CRYSTAL

(76) Inventor: Richard C. Henderson, 8886 Wine Valley Cir., San Jose, CA (US) 95135

(*) Notice: Subject to any disclaimer, the term of this patent is extended or adjusted under 35 U.S.C. 154(b) by 2 days.

This patent is subject to a terminal disclaimer.

(21) Appl. No.: 09/593,833

(22) Filed: Jun. 13, 2000

(51) Int. Cl.$^7$ .................................................. G01F 1/37
(52) U.S. Cl. ................................. 73/861.52; 73/861.61
(58) Field of Search ........................... 73/861.52, 861.61

(56) References Cited

U.S. PATENT DOCUMENTS

| | | | |
|---|---|---|---|
| 4,986,127 A | * | 1/1991 | Shimada et al. ............... 73/714 |
| 5,086,655 A | * | 2/1992 | Fredericks et al. ......... 73/861.61 |
| 6,056,269 A | | 5/2000 | Johnson et al. .............. 251/331 |
| 6,247,493 B1 | * | 6/2001 | Henderson ................ 137/487.5 |

* cited by examiner

Primary Examiner—Harshad Patel
Assistant Examiner—Corey D. Mack
(74) Attorney, Agent, or Firm—Thomas Schneck

(57) ABSTRACT

A flow meter for use in a flow stream with a tubular housing, including a fluid inlet and a fluid outlet, in the flow stream, with the inlet pressure exceeding the outlet pressure. The interior has an orifice defined in a crystalline silicon membrane, along crystal planes of the silicon so that the geometry of the orifices is precisely known and has a sharp knife edge rim profile. Where the fluid is a gas, pressure and temperature transducers measure conditions inside of the housing for application of gas law principles. By using instantaneous pressure and temperature in the chamber, mass flow through the outlet orifices of the chamber is computed and delivered as an output signal.

9 Claims, 2 Drawing Sheets

HIGH ACCURACY FLOW RESTRICTOR USING CRYSTAL

TECHNICAL FIELD

The invention relates to fluid flow measurement, in particular, to highly accurate flow measurement for gases.

BACKGROUND ART

The measurement and control of flow for liquids and gases is a major problem in various manufacturing processes. Certain industries, notably the manufacture of silicon wafers, require very accurate gas flow rates, for many different gas species.

It is well known that gas flow through a knife edge orifice follows certain laws relating flow to the gas pressures on both sides, the gas temperature, the area of the orifice and the mass density of the gas. When the pressures on both sides of the orifice are equal, there is no flow and the pressure ratio is equal to one. Flow begins when the ratio increases and generally follows the relation that flow is proportional to the product of the square root of the downstream pressure times the square root of the pressure difference. Flow in this regime is said to be sub-sonic since the gas molecules flow through the orifice at less than the speed of sound. As the pressure ratio increases further the speed of the gas molecules increases and reaches the speed of sound at a critical pressure ratio. At this point the flow is said to be sonic and it is found that flow is proportional to the upstream pressure.

Despite these well know principles it has proven difficult to reproducibly construct knife edge orifices that well consistently flow the same quantities of a given gas at the specified pressures. The reasons for this difficulty arises from several factors, including the inaccuracy in manufacturing the orifice area. Also, there is always some sidewall interaction with the gas flow such that two orifices of nominally the same area, can have flow differences as much as 30%.

An objective of the invention was to provide an improved highly accurate flow meter, based upon the gas flow versus pressure principles, for use in the especially small volumes of gas used in scientific, biomedical and engineering applications.

SUMMARY OF THE INVENTION

The present invention consists of a gas tight enclosure separated into two compartments by a crystalline membrane of silicon. There is an opening of a precise area etched into the membrane, with edges of the opening aligned along crystal planes of silicon. The membrane is sealed inside the enclosure so that gas can flow from the inlet compartment to the outlet compartment only through the orifice opening. Open passageways are provided to each compartment so that gas can flow freely into the inlet compartment from a source of gas and from the outlet compartment to a discharge destination.

Provision is made to measure the pressure inside the compartments by a transducer that supplies electrical signals proportional thereto. These signals are transmitted to control circuitry that converts them to electrical signals that correspond to the flow. The conversion factors are derived from the flow constants that define a specific crystalline orifice. In turn, the converted electrical signals are utilized to control the values shown in an alphanumeric display, thereby presenting to the viewer the desired measurement of gas flow. Corrections for temperature can be provided and a simple proportionality correction can be used to measure any gas species.

DETAILED DESCRIPTION

Figure 1:
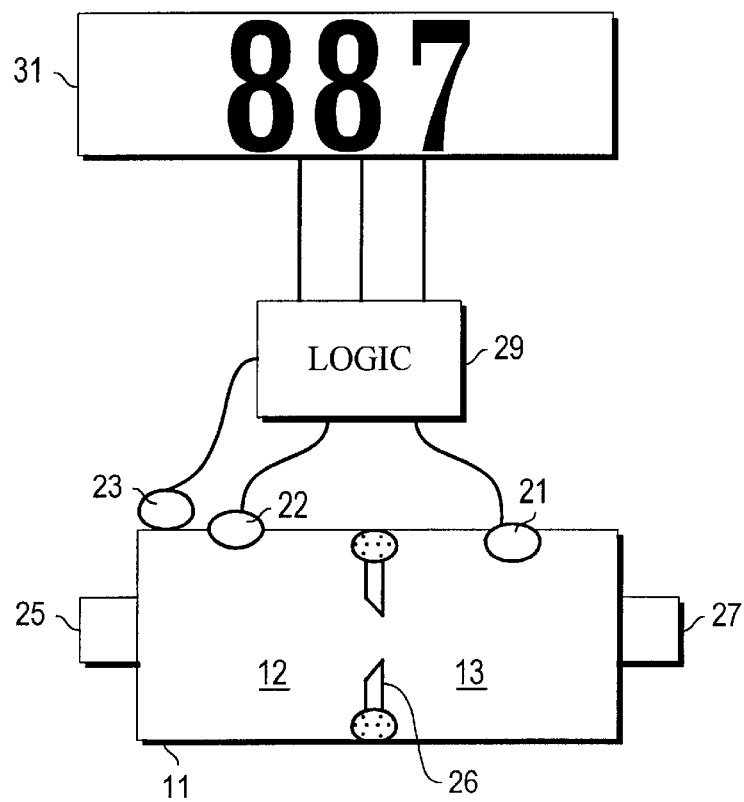
FIG. 1 is a plan view of a flow meter for gases in accordance with the present invention.

With reference to FIG. 1, a gas tight tubular enclosure or housing 11 with gas inlet and outlet passageways 25 and 27 and an inlet side interior volume 12, separated from the outlet side volume 13, by a crystalline membrane 26, containing an orifice of a precise size. A higher gas pressure always exists in the inlet volume 12 than in the outlet volume 13 for flow to occur. Provision is made for measuring the pressure and temperature within the enclosure using miniature pressure transducers 21 and 22, and temperature transducer 23. The orifice has a fixed area and provides a restricted passageway for the gas to flow from the inlet to the outlet destination, generally along the tubular axis of the enclosure. Flow through the enclosure is uniquely determined by (1) the area of the orifice, (2) the pressure difference between the inlet and outlet volumes and the temperature of the gas inside the enclosure as well as (3) the gas's molecular weight and heat capacities. The orifice lies along the tubular axis of the enclosure, but need not always be there, so long as the orifice partially blocks the flow of gas through the enclosure.

Although any orifice of a fixed area can be used, the preferred orifices are made out of a small sliver of single crystal silicon material into which an opening has been etched using etchants that have preferred etch rates depending upon the crystal axes. The silicon sliver 26 is bonded or sealed onto the housing 11 so that gas can only flow from the inlet side to the outlet side through the orifice.

Orifices of precise size are made by etching. For example, when the crystal orientation of the surface of a silicon sliver is parallel to the silicon (100) plane and the etchant is a concentrated solution of potassium hydroxide (KOH), the etchant will evolve facets of the slower etching (111) plane inside the opening. The (111) plane becomes revealed and forms a precise angle of 54.7° with respect to the (100) plane so that if etching is initiated from an inert mask opening on the top or front surface of the sliver the orifice so formed is considerably wider at the top than at the bottom or backside surface. However, the rim profile of the resulting orifice leaves a very sharp angle between the backside surface and the front surface at the opening, creating a sharp knife edge orifice. Since the sliver is a single crystal of silicon the orifice is defined by crystal planes and in the case of the silicon crystal structure the resulting orifice opening is perfectly square and its area is easily determined from measuring the opening sides from an optical microscope. Such an extremely fine edge orifice is desirable in that it minimizes the effect of sidewalls on gas flow through the orifice opening and provides for reproducible flow results from sample to sample.

Figure 2:
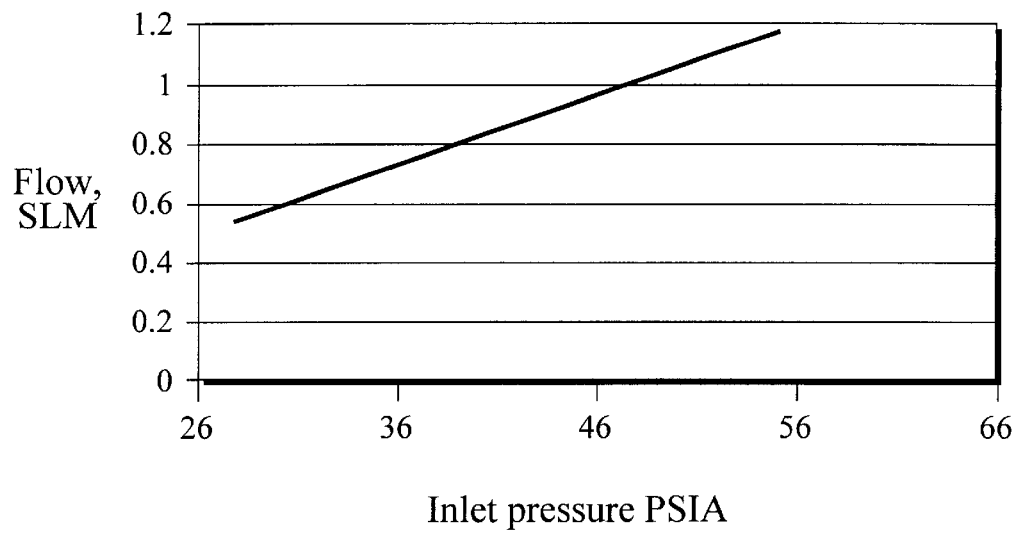
FIG. 2 is a sonic regime plot of flow versus pressure in an orifice etched in silicon for use in the apparatus of FIG. 1.

FIG. 2 shows a plot of nitrogen gas flow through an orifice of 28,0000 $\mu m^2$ area when measured versus the inlet side pressure. In this case the outlet side pressure is 15.1 Psia. A key point to note is that flow is accurately described by the equation $Q=a_sP+b_s$ where Q is flow as measured in typical units of cubic centimeters per minute where the gas is at standard values of temperature and pressure. Also, P is the pressure inside the enclosure measured in pounds/square inch absolute and $a_s$ and $b_s$ are constants of the gas, its temperature, and the orifice. Note, for high accuracy it is necessary to include the constant $b_s$.

Figure 3:
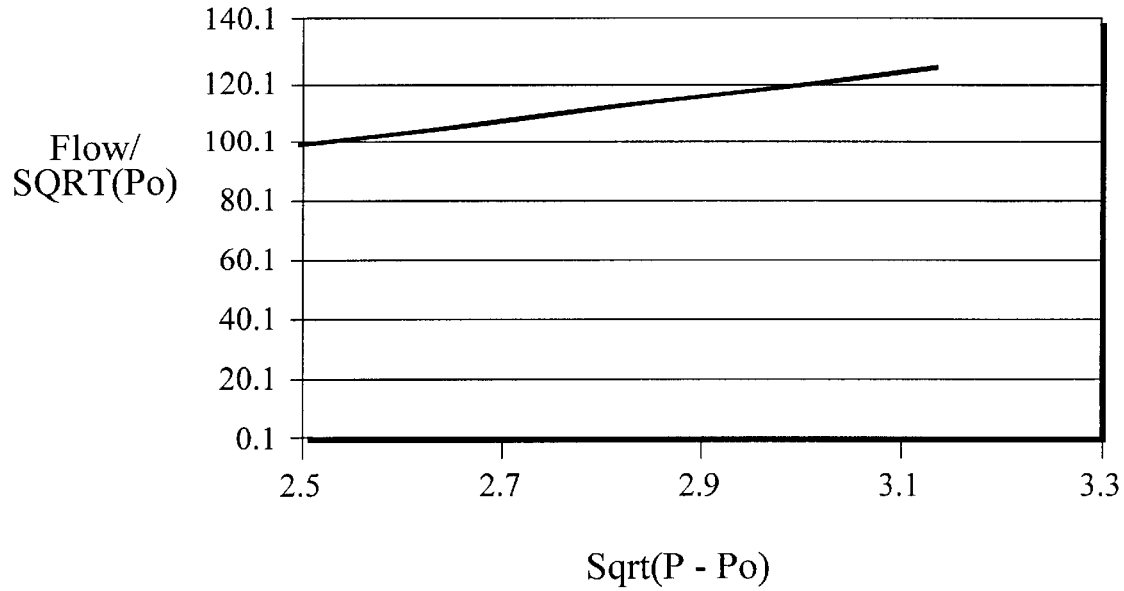
FIG. 3 is a sub-sonic regime plot of flow versus square root of pressure difference in an orifice etched in silicon for use in the apparatus of FIG. 1.

Similarly, FIG. 3 shows flow through the same orifice but when the pressure in the inlet side is less than two times the pressure in the outlet. Flow in this regime differs because the gas is traveling at sub-sonic speeds through the orifice. However, again we can see the flow is accurately described by a linear equation but this time of the form $Q/\sqrt{Po}=a\sqrt{(P-Po)}+b$ where Po is the pressure in the outlet. Again a and b are constants of the gas, its temperature and the orifice area.

Figure 4:
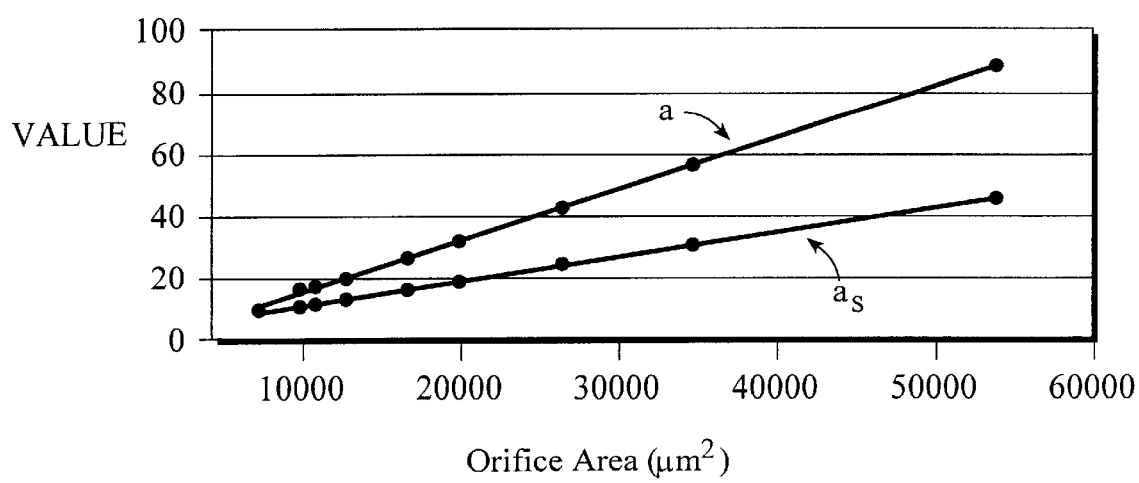
FIG. 4 is a plot of gas law parameters versus orifice area for the type of orifice described in FIGS. 2 and 3.

We have measured the flow of nitrogen gas through many orifices of varying openings made in a similar fashion by methods described above. All follow the linear properties involving the parameters a, b, $a_s$ and $b_s$. FIG. 4 shows a plot of a and $a_s$ versus orifice area for nitrogen gas at room temperature for orifices formed in slices of single crystal silicon.

The flow through these orifices is bi-directional. However, flow is greater when the flow is from the side that faces the sloped opening. The same linear pressure dependency is observed for both directions but the constants differ.

The importance of a highly linear system for flow can be appreciated in the desire for accuracy. The data gathered in FIGS. 2 and 3 are within +/−0.3%. Knowing just the four constants $a_s$, $b_s$, a and b that are specific to a particular orifice/gas combination means the meter/controller can be programmed to display this flow within the desired accuracy. The only additional conditions required are to also measure the pressure and temperature within the enclosure to the same precision.

To accomplish this display with the present invention, provision is made to measure the pressure in both the inlet and outlet volumes. A transducer converts the pressure measurement to an electrical signal that is passed to electronic circuitry, namely a logic circuit 29. Using techniques well know in the electronic art, these signals are converted by the linear equations set forth above to a new set of electrical signals that drive the numbers portrayed on an alphanumeric display. Flow rate may be displayed with a conventional electronic digital or analog display, such as display 31. Simple logic circuitry, for example in an FPGA or microcomputer, calculates the pressure ratio and depending upon the result uses the linear equations for the sonic or sub-sonic regime to display the flow.

Although the present invention utilizes two pressure transducers, in many situations a single transducer will suffice. If the default mode were to discharge to a very low pressure corresponding to a vacuum the flow for all practical cases of pressure would be in the sonic regime where only the upstream pressure determines the flow. If the default mode were to discharge to atmospheric pressure (or any constant pressure) the circuitry could be preset to calculate the critical pressure ratio and switch the calculation at the appropriate point from sonic to sub-sonic. It would also be possible to have a differential pressure measurement between the two compartments.

The invention has the capability of automatic adjustments. For example, suppose the gas flowing was some species other than the calibration gas, nitrogen, used here. In that case the a, b, $a_s$, and $b_s$ parameters are multiplied by $(M_{N2}/M_{gas})^2$ where M is the respective molecular weight of the gas or nitrogen. Similarly for temperature. Here the parameters are multiplied by $(T_{room}/T_{actual})^2$ and the ratio determined from the temperature sensor.

In its simplest configuration, the invention is a silicon sliver, cut along crystal planes, so that an aperture in the silicon sliver has a knife edge shape, where the knife edge is defined by crystal planes. The aperture is formed by lithography. In this configuration, the silicon sliver with the aperture acts as a flow restrictor.

What is claimed is:

1. A flow restrictor with apparatus for measuring fluid flow therethrough comprising,
    a housing having an inlet connected to a fluid supply and an outlet delivering a fluid supply, the inlet pressure greater than the outlet pressure, the outlet having a crystalline membrane defining an orifice of precisely known dimensions, said orifice defined along crystal planes of the membrane,
    a pressure transducer mounted in the housing, the transducer productive of electrical signals representing pressure in the housing,
    a temperature transducer mounted in the housing, the transducer productive of electrical signals representing temperature in the housing,
    an electronic logic circuit in communication with said electrical signals and pre-programmed with constants corresponding to the gas law behavior of the crystalline membrane and utilizing those signals and constants to produce a signal representing fluid flow through the housing.

2. The flow restrictor of claim 1 wherein the fluid is a gas.

3. The flow restrictor of claim 1 wherein said crystalline membrane is a portion of a silicon wafer.

4. The flow restrictor of claim 1 wherein said orifice is defined in a silicon wafer having an opening with an angular rim profile defining the orifice.

5. A flow restrictor for use in a flow meter or the like comprising,
    a membrane of silicon having a plurality of crystalline planes and front and backside surfaces parallel to a first crystalline plane of silicon and defining an aperture therein of precisely known dimensions along crystal planes thereof, with a rim profile between the surfaces having an angular profile with the angle of the backside surface to the front surface corresponding to an angle between two of the crystalline planes of silicon.

6. The device of claim 5 wherein said aperture defined in the silicon membrane is rectangular.

7. The device of claim 5 wherein said angle is 54.7 degrees.

8. The device of claim 5 wherein said membrane is mounted in a tubular housing having an axial flow of gas therethrough, said membrane blocking gas flow through the housing except through the aperture in the membrane.

9. The device of claim 8 wherein the aperture lies in the path of the axial flow of gas, partially blocking said flow.

* * * * *